United States Patent
Cavin (10) Patent No.: US 7,143,320 B2
(45) Date of Patent: Nov. 28, 2006

(54) INCREASING DATA THROUGHPUT ON A WIRELESS LOCAL AREA NETWORK IN THE PRESENCE OF INTERMITTENT INTERFERENCE

(75) Inventor: Robert D. Cavin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 10/039,649

(22) Filed: Dec. 31, 2001

(65) Prior Publication Data

US 2003/0126492 A1 Jul. 3, 2003

(51) Int. Cl.
*G06F 11/00* (2006.01)

(52) U.S. Cl. .................. 714/704; 370/333; 370/311; 370/252; 455/505; 455/506; 455/63.1; 455/78; 455/67.13; 375/346

(58) Field of Classification Search ............ 714/704.4; 370/349, 410, 333, 252, 311; 725/110; 455/522, 455/505, 506, 63.1, 78, 67.13; 375/346
See application file for complete search history.

(56) References Cited

U.S. PATENT DOCUMENTS

| | | | | |
|---|---|---|---|---|
| 6,404,776 B1 * | 6/2002 | Voois et al. | ................ | 370/468 |
| 6,643,519 B1 * | 11/2003 | Lundgren | ................ | 455/505 |
| 6,761,113 B1 * | 7/2004 | Korthauer | ................ | 101/288 |
| 6,859,463 B1 * | 2/2005 | Mayor et al. | ................ | 370/445 |
| 6,898,192 B1 * | 5/2005 | Chheda et al. | ................ | 370/311 |
| 2002/0110140 A1 * | 8/2002 | Juntti et al. | ................ | 370/441 |
| 2002/0122413 A1 * | 9/2002 | Shoemake | ................ | 370/349 |
| 2004/0045030 A1 * | 3/2004 | Reynolds et al. | ................ | 725/110 |

FOREIGN PATENT DOCUMENTS

WO     WO 01 99384 A     12/2001

OTHER PUBLICATIONS

Microsoft Press Computer Dictionary, 2nd Ed., 1993, at p. 388.*
PCT Search Report, PCT/US02/38637, Apr. 22, 2003, 8 pages.
Fainberg, M., et al., "Analysis of the Interference Between IEEE 802.11B and Bluetooth Systems," VTC Fall 2001, IEEE 54th Vehicular Tech. Conf. Proc., IEEE, US, vol. 2 of 4, Conf. 54, Oct. 7, 2001, p. 967-971.
Kurtis, J. Guth, et al., "Adaptive Stop-and-Wait ARQ Strategy for Mobile Data Communications," Computer Communications, Elsevier Science Publishers BV, Amsterdam, NL, vol. 14, No. 7, Sep. 1, 1991, pp. 405-412.

* cited by examiner

*Primary Examiner*—Guy J. Lamarre
(74) *Attorney, Agent, or Firm*—Shireen I. Bacon (57) ABSTRACT

A method for increasing data throughput on a wireless local area network in the presence of intermittent interference. The method of one embodiment comprises receiving a data packet through a wireless channel. Quality of the wireless channel is evaluated. A packet error ratio (PER) value is calculated for the data packet. The PER value is checked as to whether it is within an acceptable level. A determination is made as to whether an intermittent noise is affecting the PER value.

15 Claims, 5 Drawing Sheets

INCREASING DATA THROUGHPUT ON A WIRELESS LOCAL AREA NETWORK IN THE PRESENCE OF INTERMITTENT INTERFERENCE

FIELD OF THE INVENTION

The present invention relates generally to the field of wireless communications. More particularly, the present invention relates to a method and apparatus for increasing data throughput on a wireless local area network in the presence of intermittent interference.

BACKGROUND OF THE INVENTION

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

Furthermore, there is interest in the market for other types of computing devices. For instance, personal digital assistants, MP3 players, and cellular phones with calendar functions are growing in popularity. More and more of these devices have the capability to communicate together through wireless transmissions. For instance, many portable electronic devices are equipped with wireless transceivers adhering to wireless protocols such as the IEEE 802.11 standard or Bluetooth technology. A number of these devices can also connect to wireless local area networks (WLAN).

Given the popularity of such wireless devices, there are often times when a number of wireless transmissions are traveling through the area. These transmissions can interfere with each other and distort the signals. As a result, bad data packets or errors can occur. Current technology in some IEEE 802.11 (b) Wireless LAN access points provides a transmission speed step-down mechanism to improve signal range and resistance to noise. These access points evaluate the signal quality to a client by analyzing the packet error ratio (PER). If the PER is above a predefined threshold, the bit rate is successively dropped from 11 megabit/second (Mb/s) to 5.5 Mb/s, then to 2 Mb/s, and finally to 1 Mb/s if the PER does not improve over time. This mechanism allows clients with low signal to noise ratios due to a weak constant interfering source or a low received signal strength to receive transmissions at a reduced bit rate. However, this transmission rate step-down algorithm does not improve throughput if the interfering source is strong enough to block transmissions even at lower data rates.

The PER does not distinguish between a low noise environment and an environment having a sporadic noise source such as a Bluetooth device that corrupts packets only when the Bluetooth device and Wireless LAN devices are concurrently transmitting. In both cases, there is a random chance that a bit error will occur that is proportional to the ratio of the strength of the interfering noise to that of the desired signal. Thus at threshold regions, a packet error due to high noise can look the same as a packet error from sporadic noise. A packet error can be attributed to single bit error during the whole transition period.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and apparatus for increasing data throughput on a wireless local area network in the presence of intermittent interference is disclosed. The embodiments described herein are described in the context of a mobile computer, but are not so limited. Although the following embodiments are described with reference to a notebook computer system, other embodiments are applicable to other types of computers, portable computing devices, and handheld electronic devices. The same techniques and teachings of the present invention can easily be applied to other types of devices or systems that can benefit from increasing data throughput on a wireless local area network in the presence of intermittent interference.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

The existing rate back-off algorithm currently employed in some wireless local area networks (WLAN) causes the bit rate to fall back to 1 Mb/s when frequency hopping spread spectrum (FHSS) noise is present. As a result, the data throughput of an 11 Mb/s 802.11(b) network may be reduced from a maximum of 4.8 Mb/sec with no interference to 400 kilobits/second (Kb/s) when an interfering FHSS transmitter is near a WLAN receiver. However, this back-off mechanism unnecessarily decreases the maximum throughput attainable when frequency hopping spread spectrum (FHSS) interferers are present. These FHSS devices primarily cause interference in a WLAN channel at random times with random length gaps in between the occurrences. Actually, a lesser impact on the WLAN performance can result if the bit rate is kept high, such that as much data as possible can be transmitted in the gaps in time between interference events. Some rate back-off algorithms cause the bit rate of 802.11(b) products to drop back in the presence of any noise source that causes channel degradation above a certain threshold.

This technique unnecessarily causes severe throughput reduction on the 802.11(b) network when in the presence of FHSS devices or other noise sources that cause interference in the WLAN band at random times or at a random duty cycle.

The 802.11(b) communication standard uses direct-sequence spread spectrum (DSSS). Bluetooth technology is based on FHSS. Both the 802.11(b) standard and Bluetooth technology work in an 80 Megahertz (MHz) wide frequency band that ranges from 2.40 to 2.48 GHz. This is also referred to as the 2.4 GHz Industry, Science, and Medical (ISM) band. The ISM band is a free band that anyone can build devices to use without having to pay for a license. As such, both the 802.11(b) standard and Bluetooth technology are designed to use this same frequency band. The DSSS for the 802.11(b) standard transmits over a 22 MHz wide channel, while the Bluetooth technology has seventy-nine 1 MHz wide channels on which to transmit. Bluetooth devices transmit an entire packet over a single channel and then hop to another in a pseudo-random sequence to transmit or receive the next data. Thus, a problem can occur during the instances when a Bluetooth device is transmitting and the Bluetooth transmission happens to hop into one of the frequency bands in which an 802.11(b) device is using. If both types of devices are transmitting packets and are in close proximity, there is a very high likelihood that the data packets for both the 802.11(b) unit and the Bluetooth unit will be corrupted. Ideally, the frequency hopping performed by Bluetooth devices would allow for operation with WLAN devices. However, current regulations prevent Bluetooth-enabled devices from using fewer than 75 of the 79 channels, and thus some transmissions must fall in the range of the 802.11(b) stationary channel. Thus the 802.11(b) throughput drops significantly in the presence of Bluetooth traffic.

Another issue is the reduction of throughput over time. A wireless device is generally designed to maintain a high throughput. But transmission rates can fall back sporadically due to various reasons. For instance, with the 802.11(b) standard, a device can attempt to extend the range of the network if a high noise environment is present. Similarly, if the wireless device is far away from the wireless access point, the device may drop the data rate down. As a result, a lower signal to noise ratio is needed to receive the signals. When a Bluetooth device is close by an 802.11(b) device, the Bluetooth transmissions cause some of these packet errors by the collisions. This Bluetooth traffic also causes the 802.11(b) data rate to fall back. The data rate drop may help the throughput because of the resulting higher carrier to interference ratio. A problem arises when the Bluetooth traffic is more powerful than the 802.11(b) signal at even the receiver. This implies that regardless of the data rate the 802.11(b) device is using, the 802.11(b) packets will likely be corrupted.

When an 802.11(b) device is transmitting at 11 Mb/sec, the packet time is typically 1.2 milliseconds (ms) long. As the transmission rate is decreased to 5.5 Mb/sec, the longest data packet time becomes 2.4 ms long. Even though the same amount of data is being transmitted, the packet is now taking a longer amount of time to send over air. Because the Bluetooth hops are random, there is a greater chance of hopping into the 802.11(b) channels during the longer transmission times. Similarly, at the 2 Mb/sec and 1 Mb/sec rates, the maximum number of bits that can be transmitted at one time actually decreases. As the data rate continues to be backed down to 1 Mb/sec, a single packet time approaches 5 ms long. Thus the likelihood of a data packet becoming corrupted is significantly increased.

A cyclic redundancy check (CRC) is performed on each packet that is sent. For example, if 1000 bits are transmitted, there may be a 32-bit CRC that can indicate whether there is a bad packet or an error in the data. However, if even a single bit is found to be incorrect by the CRC, the whole packet has to be retransmitted. Thus any collision between packets can be fatal. For example, if there is 802.11(b) packet traffic and Bluetooth traffic overlaps any portion of the packet, the entire packet is lost.

Contrary to existing schemes, embodiments of the present invention do not back down the data rate in the presence of Bluetooth traffic. Furthermore, methods in accordance with the present invention attempt to transmit as fast as possible in the periods available when the Bluetooth traffic does not fall into the channel. The shorter the packet transmission time, the better the utilization of the available contention-free time and a lower probability of packet collisions. Thus a device including a method of the present invention may get the maximum utilization out of the clear channel time.

An 802.11(b) wireless device including an embodiment of the present rate back-off mechanism can achieve a competitive advantage in the WLAN marketplace without impacting coexistence with other 802.11(b) products. Furthermore, because the algorithm of this embodiment resides in firmware, updates can be easily applied to both new and existing devices that contain appropriate hardware at virtually no cost. The present rate control mechanism can reduce the 802.11(b) WLAN throughput degradation currently seen when Bluetooth or other FHSS technologies are used in the vicinity. This algorithm can also reduce the impact of 2.4 GHz band home appliances such as FHSS cordless phones and microwave ovens. Similarly, this algorithm can also be useful for any future wireless technology that uses DSSS technology and is used in frequency regions that fall within the interference range of FHSS devices. Embodiments of the adaptive algorithm in accordance with the present invention are able to differentiate between interfering sources, such as FHSS interferers and microwaves that are causing intermittent interference and end-of-range or constant noise conditions, and back off the transmission rate.

The algorithm for one embodiment of the present invention can identify when an intermittent interfering source, such as FHSS devices, is present and to prevent the WLAN bit rate from backing down in such a scenario. The rate back-off algorithm is currently implemented in firmware of WLAN access points. Thus a back-off mechanism has access to sensory information such as the return signal strength indicator (RSSI), bit error ratio (BER), and packet error ratio (PER). One embodiment of the algorithm will cause the bit rate to remain at 11 Mb/sec in cases where a random interferer is detected, but will also preserve the functionality of the rate back-off algorithm in other interference situations.

The mechanism in accordance with the present invention makes use of the RSSI values. RSSI values are typically used to adjust the power level of the transmitter. If a signal is being received very strongly, then power may be wasted on the transmitting side. Thus the power is backed down. An 802.11(b) device performs a check of the medium before the device transmits anything to make sure that no other 802.11(b) device is also transmitting. The 802.11(b) device also waits and checks for any Bluetooth activity in the same band. If a Bluetooth packet happens to be present, the 802.11(b) packet should not transmit. If comparison of an RSSI value prior to a transmission with an RSSI value from the tail end of the transmission shows a large difference, then a reasonably high signal to noise ratio may be present. In that case, it may be helpful to shift the rate up to the highest rate possible.

Several different methods can be used to measure the signal to noise ratio. Typically, an RSSI check evaluates a number of characteristics. One is the average power in the channel over a given period of time. For instance, a mechanism can conduct a code lock to determine whether or not the proper data is being received. Another characteristic useful in this case is the absolute power level in the channel. If an RSSI check is done when a collision occurs between an 802.11(b) packet and a Bluetooth packet, the RSSI value is actually going to be fairly high because of the combined energy from 802.11(b) and Bluetooth packets. As stated above, when a high RSSI value is present, the bit rate should be increased if possible. If some other intermittent traffic is present, the data rate should be decreased. For instance, if the average power in the channel value at the end of the packet and the average power at the beginning of the packet are similar but the PER starts to rise, then the data rate should be dropped back.

The algorithm for one embodiment tracks a set of RSSI values for successfully acknowledged data packets in a circular buffer. The earlier stored packets in the limited size buffer are gradually overwritten by later values. If a packet error occurs, the algorithm checks the PER. If the PER is below a predefined drop rate threshold, the mechanism determines that there is minimal interference in the channel and no change is made. But if the PER exceeds this drop rate threshold, the sum of all the RSSI values in the circular buffer is evaluated to determine whether the previously received packets had strong signal strength. Prior strong signal strength can indicate that the interference that caused the recent packet error was not previously present. If this RSSI sum exceeds a second RSSI raise rate threshold, then the present bit rate is upgraded in order to maximize performance in the presumed random noise environment. Otherwise, the interference is considered constant and the bit rate is reduced instead. Alternatively, the bit rate is increased in order to maintain the best connection possible if a packet is successfully received and the PER of previous data packets are below a certain raise rate threshold.

Figure 1A:
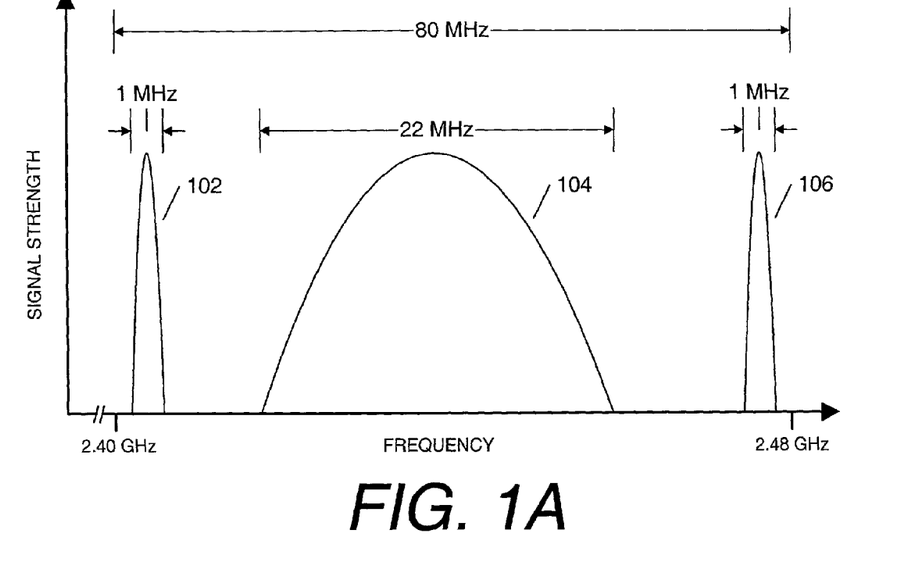
FIG. 1A is a graph of signals in the frequency spectrum for one embodiment.

Although the following examples are described in the context of the IEEE 802.11(a) standard, IEEE 802.11(b) standard, and Bluetooth technology, embodiments in accordance with the present invention are not so limited. Alternate embodiments of the present invention can be used with other types of wireless protocols and technologies. FIG. 1A is a graph of signals in the frequency spectrum for one embodiment. This graph plots the signal strength across a particular frequency spectrum, namely from 2.40 gigahertz (GHz) to 2.48 GHz. In this diagram, the signals for three individual wireless transmissions are present. There are two Bluetooth signals 102, 106, of 1 MHz wide bands are located at each end of the spectrum. However, a Bluetooth signal can be located anywhere within this 2.40–2.48 GHz band. An 802.11(b) signal 104 having a 22 MHz wide band is also located in this spectrum. During operating conditions, this frequency spectrum may have any number of wireless signals transmitted in the 80 MHz band. Furthermore, these signals may at times overlap. For instance, a Bluetooth signal may hop into the frequency region occupied by an 802.11(b) signal. In such an event, the overlapping signals can cause interference and noise, resulting in corrupted data.

Figure 1B:
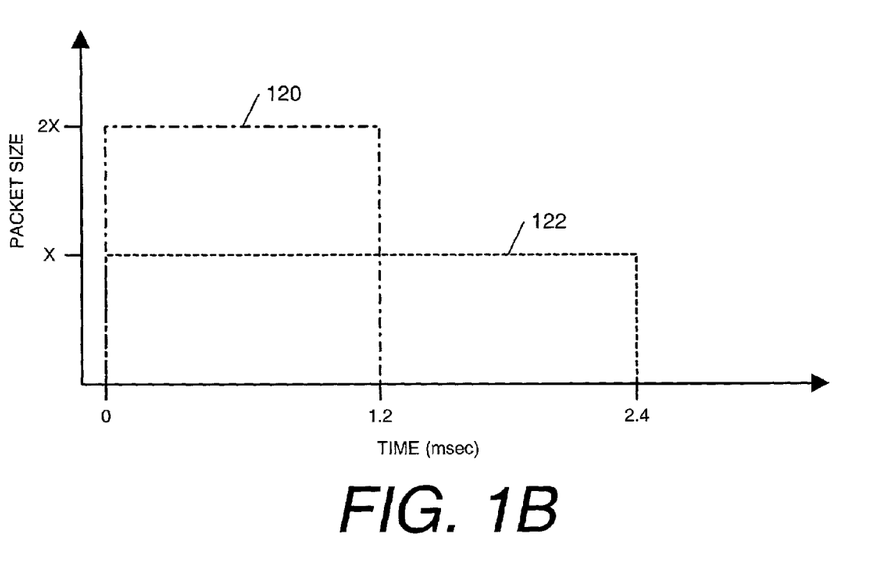
FIG. 1B is a graph of time versus packet size for equivalent data packets.

FIG. 1B is a graph of time versus packet size for equivalent data packets. In this example, the packets are described in the context of the 802.11(b) standard. A first data packet 120 is shown as having a packet size of X and lasts for 1.2 milliseconds (msec). Similarly, a second data packet 122 has size X and extends for 2.4 msec. The first data packet is transmitted at a data bit rate of twice that of the second data packet. Even though the transmission times are different, the same amount of data can be transmitted in both packets. For example, the first data packet 120 contains twice the amount of data for the same 1.2 msec period of time as the second data packet 122. The lower bit rate of the second data packet 122 simply extends the transmission to twice the amount of time with the same packet size of the first data packet 120. This example shows that by backing off the data rate by half, the amount of data transmitted in a given period is also cut in half and results in a doubling of the transmission time to send the same amount of data.

Figure 2:
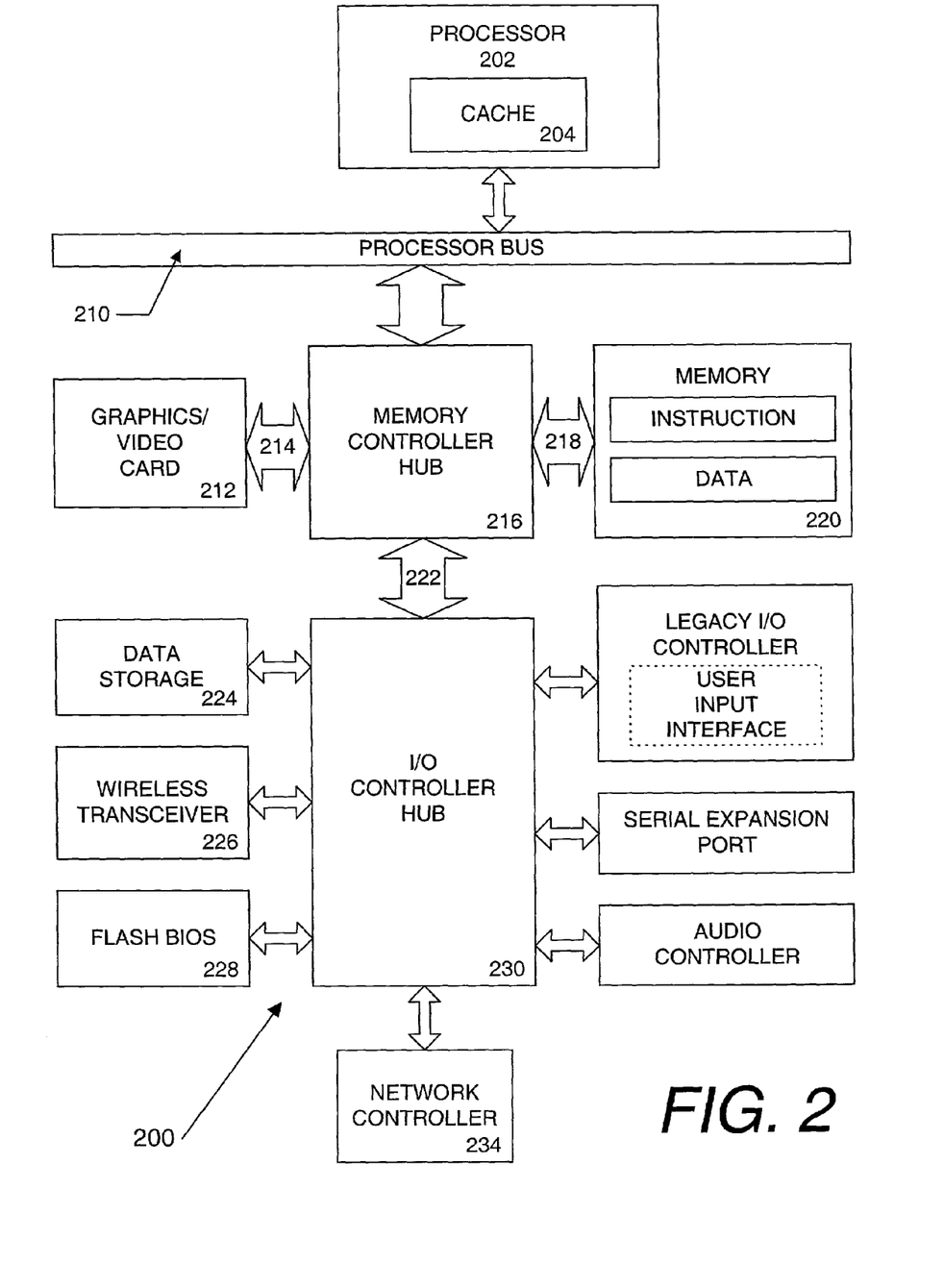
FIG. 2 is a block diagram of a computer system having a capability to increase data throughput on a wireless link in the presence of intermittent interference in accordance with the present invention.

Referring now to FIG. 2, an exemplary computer system 200 is shown. System 200 includes an arrangement of components to employ a method to increase data throughput on a wireless link in the presence of intermittent interference in accordance with the present invention, such as in the embodiment described herein. System 200 is representative of processing systems based on the PENTIUM® III, PENTIUM® 4, Itanium™, and/or StrongARM™ microprocessors available from Intel Corporation of Santa Clara, Calif., although other systems (including PCs having other microprocessors, engineering workstations, set-top boxes and the like) may also be used. In one embodiment, sample system 200 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

The present enhancement is not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include network computers (NetPC), set-top boxes, network hubs, wide area network (WAN) switches, or any other system that utilizes wireless communications.

FIG. 2 is a block diagram of a computer system 200 having a capability to increase data throughput on a wireless link in the presence of intermittent interference in accordance with the present invention. The processor 202 includes an internal cache memory 204. The present embodiment is described in the context of a single processor desktop or server system, but alternative embodiments can be included in a multiprocessor system. System 200 is an example of a hub architecture. The computer system 200 includes a processor 202 to process data signals. The processor 202 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 202 is coupled to a processor bus 210 that transmits data signals between the processor 202 and other components in the system 200. The elements of system 200 perform their conventional functions that are well known to those familiar with the art.

System 200 includes a memory 220. Memory 220 can be a dynamic random access memory (DRAM) device, a static random access memory (SRAM) device, flash memory device, or other memory device. Memory 220 can store instructions and/or data represented by data signals that can be executed by the processors 202. An internal cache memory 204 can reside inside the processor 202 to store recently used data signals from memory 220. Alternatively, in another embodiment, the cache memory can reside external to the processor 202.

A system logic chip 216 is coupled to the processor bus 210 and memory 220. The system logic chip 216 in the illustrated embodiment is a memory controller hub (MCH). The processor 202 communicates to the MCH 216 via a processor bus 210. The MCH 216 provides a high bandwidth memory path 218 to memory 220 for instruction and data storage and for storage of graphics commands, data and textures. The MCH 216 is to direct data signals between the processor 202, memory 220, and other components in the system 200 and to bridge the data signals between processor bus 210, memory 220, and system I/O 222. In some embodiments, the system logic chip 216 can provide a graphics port for coupling to a graphics controller 212. The MCH 216 is coupled to memory 220 through a memory interface 218. The graphics card 212 is coupled to the MCH 216 through an Accelerated Graphics Port (AGP) interconnect 214.

System 200 uses a proprietary hub interface bus 222 to couple the MCH 216 to the I/O controller hub (ICH) 230. The ICH 230 provides direct connections to some I/O devices via a local I/O bus. The local I/O bus is a high-speed I/O bus for connecting peripherals to the memory 220, chipset, and processor 202. Some examples are the audio controller, firmware hub (flash BIOS) 228, data storage 224, legacy I/O controller containing user input and keyboard interfaces, a serial expansion port such as Universal Serial Bus (USB), and a network controller 234. The data storage device 224 can comprise a hard disk drive, a floppy disk drive, a CD-ROM device, a flash memory device, or other mass storage device.

For the embodiment of a computing system 200 in FIG. 2, a wireless transceiver 226 is also coupled to the ICH 230. The wireless transceiver is capable of receiving and transmitting data from the system 200 through the ICH 230 as well as using wireless signals to receive and transmit data from remote systems. Control of the transceiver 226 resides with device driver software and memory 220, which communicates with firmware software and memory residing on the wireless transceiver 226. The processor 202 can execute instructions from memory 220 that cause the processor to send data to and request from the wireless transceiver. Application software and the operating system, working through the wireless transceiver device driver, can interface the wireless transceiver 226. The wireless transceiver enables the system 200 to communicate with other computers and devices that have wireless capability.

Figure 3:
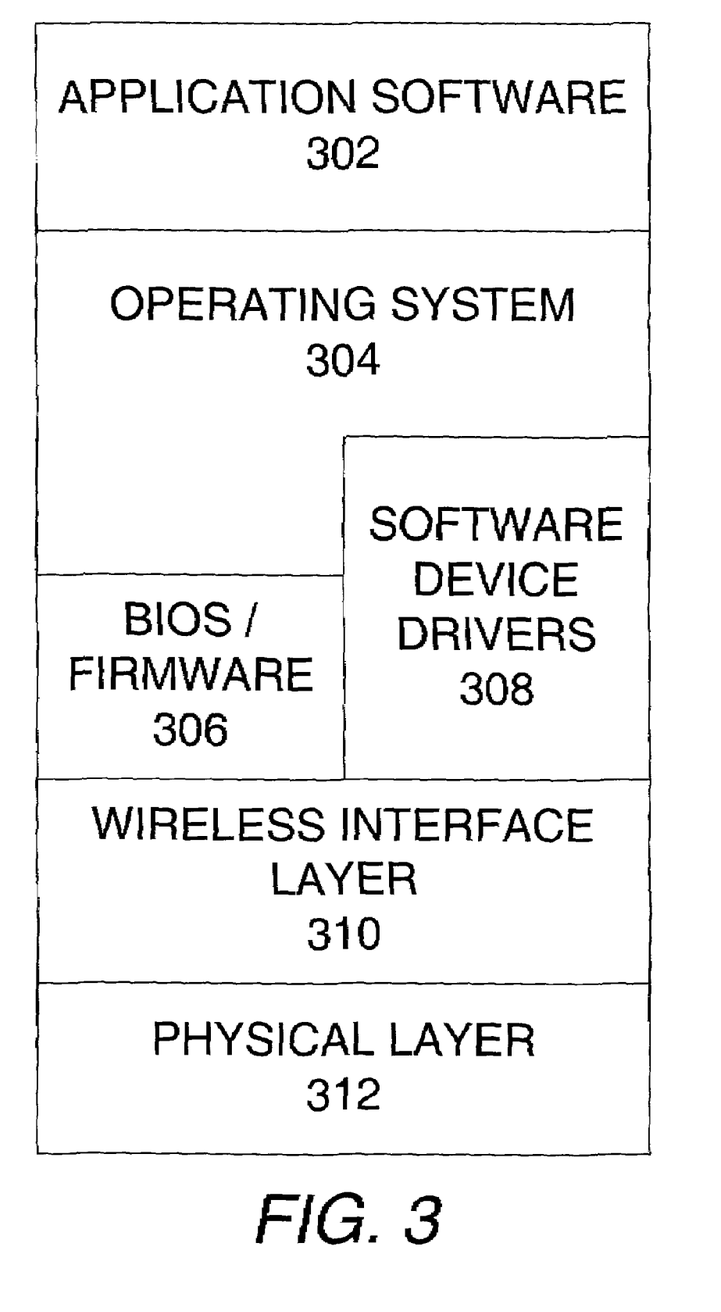
FIG. 3 is a block diagram of the software stack residing in a computer of one embodiment.

FIG. 3 is a block diagram of the software stack residing in a computer of one embodiment. The software stack shown in FIG. 3 comprises of application software 302, an operating system 304, BIOS/firmware 306, software device drivers 308, an interface layer 310, and a physical layer 312. For one embodiment, the upper level of the software stack in the computer is application software 302. The application software 302 runs on top of the operating system 304, such as a version of Microsoft Windows. The operating system 304 is generally the software interface between a user and system hardware. A user can input commands and data to control software application 302, which in turn directs the inputs to the appropriate portions of the operating system 304.

The next layer of software in the stack comprises of software device drivers 308. Device drivers 308 handle the software commands and instructions from the operating system 304 and issues the related control signals to hardware devices or controllers. Often, a device driver 308 is provided by the hardware manufacturer and is specific to a particular hardware device. However, generic device drivers may also be available for devices such as keyboards and mice. These device drivers 308 can also be part of the operating system 304. In the software stack of this embodiment, a wireless interface layer 310 exists between the software device drivers 308 and the embedded code of the physical layer 312. For this embodiment, the interface layer 310 can include software within a controller that is compliant with a wireless protocol, such as the IEEE 802.11 communication standard or Bluetooth wireless technology, and can comprise of a mix of hardware circuitry and embedded code. This wireless interface layer 310 enables the software device drivers 308 to use the wireless transceiver to communicate with wireless devices. The interface layer 310 of this embodiment translates commands and data packets from the device drivers 308 and prepares them for transmission on a system management bus.

Another piece of software is the BIOS/firmware 306 that can also access the wireless interface layer. Some devices may choose to use the BIOS/firmware layer 306 to make wireless communications rather than using application software 302 or device drivers 308 within the operating system 304. The BIOS/firmware 306 can interact with the wireless transceiver and hardware in the same way. An 802.11(b) medium access controller (MAC) can also reside in the firmware 306. This MAC is typically the interface controller between the software and the network card. For one embodiment, the capabilities for measuring and evaluating the RSSI, PER, etc. are handled in the firmware by the 802.11(b) MAC. Furthermore, the MAC software of some existing wireless devices may be updated to provide support for the methods of the present invention. In an alternative embodiment, half the MAC is in the software driver 308 and half is in the card firmware. The physical layer 312 of this embodiment can also include a wireless transceiver and other wireless hardware with embedded code. Although the software stack described in this example is for a typical notebook computer system, similar software stacks can be used with other types of wireless devices.

Figure 4:
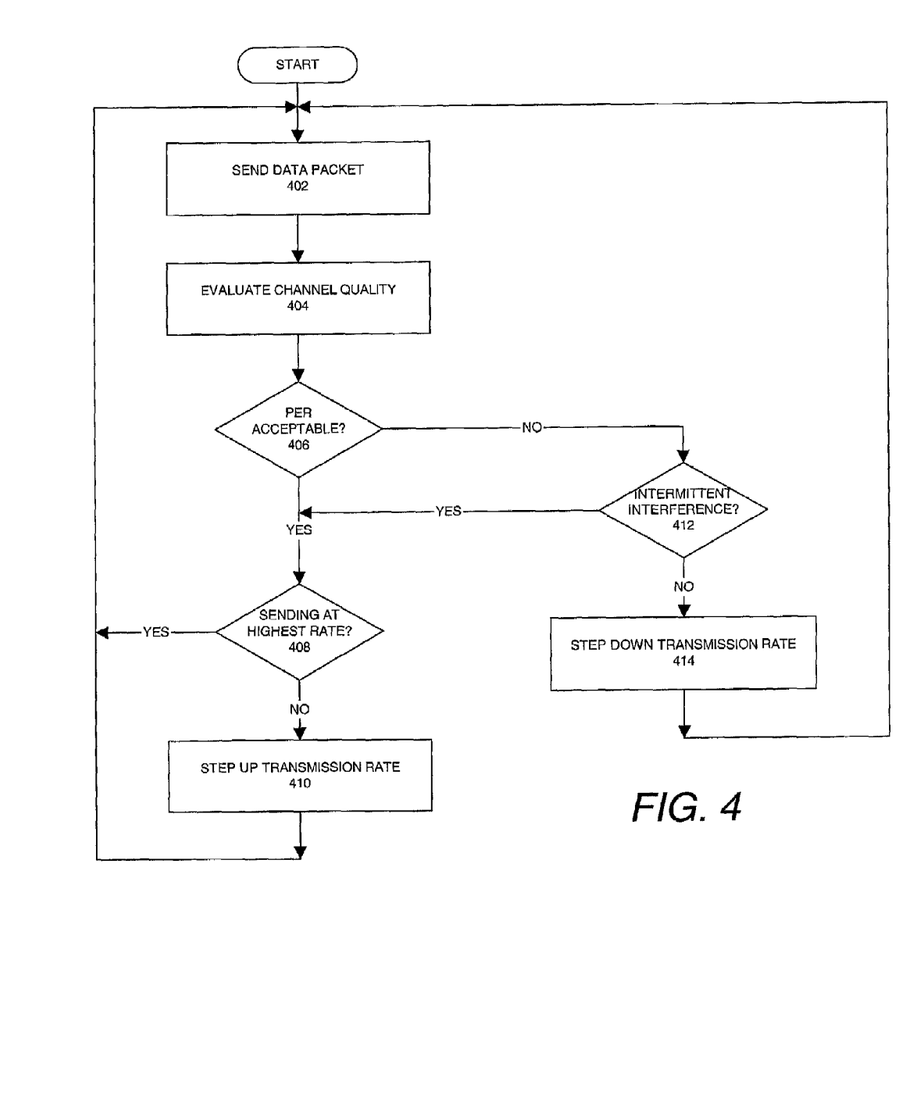
FIG. 4 is a flow chart showing one embodiment of a method to increase data throughput on a wireless network.

FIG. 4 is a flow chart showing one embodiment of a method to increase data throughput on a wireless network. At block 402, a data packet is sent from a first wireless device. The data packet is received at a second wireless device and the channel quality evaluated at block 404. The type of any noise source is also determined. If interference is intermittent, the transmission rate of the wireless local area network is increased to improve throughput. If interference is constant or received signal strength is low, the transmission rate may be increased, backed down, or maintained based on quality of the channel. In evaluating the channel quality, the PER is determined to be acceptable or not at block 406. If the PER is above a predefined acceptable level, thus indicating the presence of high noise or interference, the control mechanism determines at block 412 whether this interference is attributed to FHSS interference such as Bluetooth traffic. If the interference is from an FHSS or other intermittent interfering source, the bit rate is increased if possible at block 408. Increasing the data rate allows the device to transmit as much information possible in contention-free periods, thus improving the efficiency. Decreasing the data rate in the presence of an intermittent frequency-hopping source such as a Bluetooth device can unnecessarily decrease the data throughput and efficiency as the interference may not be present in subsequent packet traffic. But if the interference is found not to be from an intermittent interfering source but is instead due to a weak constant interferer or low signal to noise ratio, the data transmission rate is stepped down at block 414.

If the PER is found to be within the acceptable region at block 406, the rate control mechanism determines whether the device is transmitting at the highest rate possible at block 408. Because the quality of the transmission is considered sufficient at the present data rate regardless of the type of interference, the mechanism of this embodiment attempts to increase the efficiency and increase the throughput by executing at the highest data rate possible within the acceptable error region. If the device is already at the highest rate, then that rate is maintained for the subsequent transmission. But if the device is not transmitting at the highest rate, the data rate for the device is stepped up to a higher data rate at block 410 for the next transmission in order to shorten the packet transmission time and increase efficiency.

Figure 5:
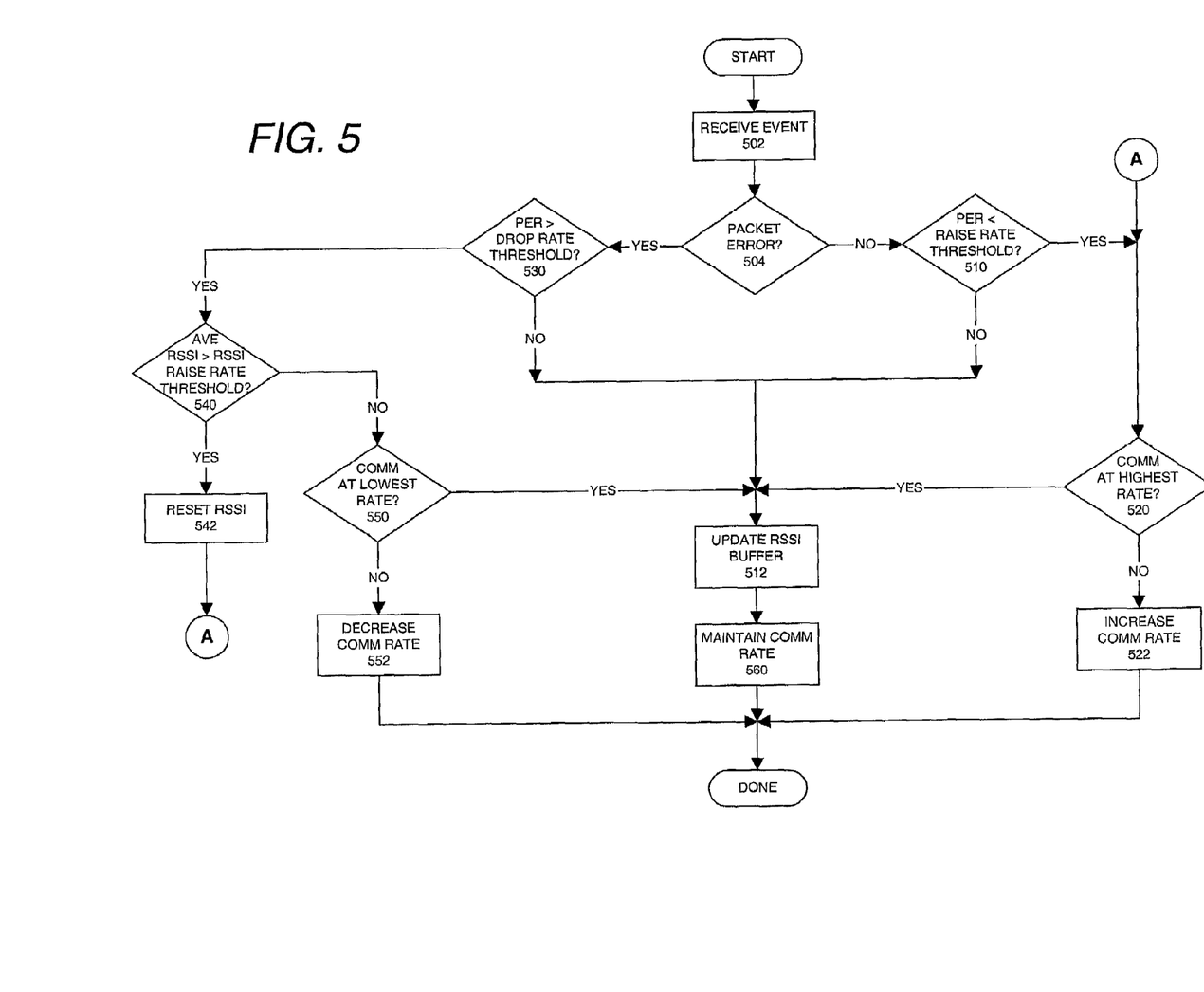
FIG. 5 is a flow chart showing another embodiment of a method in accordance with the present invention to increase data throughput on a wireless network in the presence of intermittent interference.

FIG. 5 is a flow chart showing another embodiment of a method in accordance with the present invention to increase data throughput on a wireless network in the presence of intermittent interference. At block 502, an event is received at a wireless device. The event is generally the arrival of a data packet sent from another wireless device in the area. The control mechanism in the recipient device checks for packet errors (and evaluates the new PER) at block 504. If no packet error is found at block 504, the mechanism checks whether the PER is less than a "raise rate" threshold at block 510. The "raise rate" threshold for this embodiment is defined as the error ratio value below which the wireless data rate can be increased to optimize data throughput. In other words, the error ratio is low enough that an increase in the bit rate and data throughput may be allowable without causing significant packet errors. Thus if the PER is less than the "raise rate" threshold at block 510, the mechanism at block 520 checks whether data is presently being transmitted at the highest bit rate. If the device is not yet transmitting at the highest rate possible, the communication rate is increased at block 522. But if communications are already occurring at the highest rate possible, the RSSI buffer is updated with the strength of the previous transmission at block 512 and the present bit rate is maintained at block 560. Should the PER be found to be greater than the "raise rate" threshold, meaning that the amount of packet errors in the current transmissions are still acceptable but any increase in the bit rate may cause unacceptable errors in the data packets, then the RSSI value for this data packet is stored at block 512 in an RSSI buffer or memory location for future reference. Because the PER is acceptable at the current transmission rate and any increase may make the error unacceptable, the communication rate is maintained at block 560.

If a packet error is found at block 504, the mechanism checks whether the PER is greater than a "drop rate" threshold at block 530. The "drop rate" threshold for this embodiment is defined as the error ratio value above which the wireless data rate should be decreased to optimize data integrity. In other words, the error ratio is high enough that a decrease in the bit rate and data throughput can be helpful in reducing the amount of packet errors in subsequent transmissions. Thus if the PER is less than the "drop rate" threshold at block 530, the error rate is tolerable. Furthermore, the error may be due to a random packet error. Random interference can be attributed to a variety of sources. For example, a microwave has a 50% duty cycle and can cause interference just like a Bluetooth source. As a result, a microwave can also sporadically interfere with an 802.11(b) device. But if a wireless device is anywhere close to a microwave that is on, there is essentially no possibility of getting a data packet through the interference at any data rate during the active part of the microwave duty cycle. Thus there is no reason to back the data rate down because no transmissions will be successful. The RSSI value of the erroneous packet is stored at block 512. The present communication rate is maintained at block 560 for the subsequent data packet.

If the PER is greater than the "drop rate" threshold at block 530, the mechanism at block 540 checks whether the average RSSI value of the recent data packets is greater than the "RSSI raise rate" threshold. The RSSI value is evaluated over several packets. For this embodiment, the average RSSI value is an average of the ten most recent data packets. In alternative embodiments, the average or can be based on any number of recent data packets. Similarly, a median RSSI value can also be used in the evaluation. The RSSI value is an indication of the signal strength in the channel and can helpful in evaluating the condition of the particular frequency spectrum. The "RSSI raise rate" threshold is a signal strength value above which the strength of the particular data packets is considered sufficiently strong. Prior strong signal strength in recent packets can indicate that the interference encountered with the current packet was not previously present. At block 540, if the average RSSI of the recent data packets is found to be greater than the "RSSI raise rate" threshold, then the current interference was not in the channel earlier. The RSSI buffer is reset at block 542. Because the average RSSI was above the "RSSI raise rate" threshold, the algorithm of this embodiment initially considers the interference to be intermittent and attributed to a sporadic or FHSS source such as a Bluetooth device. The mechanism attempts to operate more efficiently in the presence of this interference by increasing the data rate, which in turn shortens the transmission time. The shorter transmission time provides less opportunity for another signal source to overlap with the desired data packet traffic. A check is made at block 520 as to whether the data rate is at the highest setting. If the communication rate is not at the highest rate, the rate is increased at block 522. If the communication rate is already at the highest rate at block 520, the current communication rate is maintained at block 560 for the next packet transmission.

If the average RSSI value is determined to be less than the "RSSI raise rate" threshold at block 540, the interference or noise found in the current data packet may have also been encountered in other recent data packets. For instance, the wireless devices may be situated in a noisy environment. Because this signal strength is considered low and the interference may be adversely affecting the wireless traffic, the mechanism attempts to lower the bit rate to reduce the signal to noise ratio required to receive the signal. At block 550, a check is made as to whether the communication rate is at the lowest setting. If the communication rate is already at the lowest rate, that rate cannot be lowered any more and is maintained for the subsequent data packet at block 560. But if the communication rate is not at the lowest level yet, the communication rate is dropped at block 552 to a lower rate.

Although the above examples describe the control and adjustment of data packets to increase data throughput in the context of a hardware controller and logic, other embodiments of the present invention can be accomplished by way of software. Such software can be stored within a memory in the system. Similarly, the code can be distributed via a network or by way of other computer readable media. For instance, a computer program may be distributed through a computer readable medium such as a floppy disk or a CD ROM, or even a transmission over the Internet. Thus, a machine-readable medium can include any mechanism for storing or transmitting information in a form readable by a machine (e.g., a computer). For example, a machine-readable medium can include a read only memory (ROM), random access memory (RAM), magnetic disk storage media, optical storage media, flash memory devices, and electrical, optical, acoustical or other forms of propagated signals (e.g., carrier waves, infrared signals, digital signals, etc.).

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. An apparatus comprising:
   a wireless transceiver to send and receive data packets of X length via wireless communications;
   a network interface card coupled to said wireless transceiver, said network interface card to connect to another wireless device to form a wireless local area network; and
   firmware comprising control logic to calculate a packet error ratio (PER) value for said data packets, check whether said PER value is within an acceptable level, determine whether an intermittent interference is affecting said PER value, and step up data transfer rate at which future data packets are to be transmitted if said PER value is greater than a drop rate threshold and if an intermittent interference is detected.

2. The apparatus of claim 1 wherein said control logic is to further determine whether said intermittent interference is due to a frequency hopping spread spectrum (FHSS) wireless device.

3. The apparatus of claim 2 wherein said FHSS wireless device is a Bluetooth device.

4. The apparatus of claim 1 wherein said apparatus is a 802.11(b) protocol compatible wireless device.

5. The apparatus of claim 1 wherein said control logic is further to step down said transfer rate at which said future data packets are to be transmitted if said PER value is greater than said drop rate threshold and a constant noise is detected.

6. The method of claim 5, wherein said control logic is further to step down the data transfer rate only if the current data rate is greater than a lowest data rate.

7. The method of claim 1, wherein said control logic is further to step up the data transfer rate at which future data packets are to be transmitted only if the current data rate is less than a highest data rate.

8. The method of claim 1, wherein said future data packets are of length X.

9. A method comprising:
   determining a packet error ratio for transmissions of packets of X length, at a current transmission rate, between two direct-sequence spread spectrum ("DSSS") devices through a wireless channel;
   if the packet error ratio is above a predefined threshold, detecting if intermittent interference is present on the wireless channel; and
   if intermittent interference is detected, increasing the transmission rate for the wireless channel while maintaining the packet length.

10. The method of claim 9, wherein increasing the transmission rate further comprises:
    determining if the current transmission is the highest of a predefined set of transmission rates; and
    if the current transmission rate is not the highest of the predefined transmission rates, increasing the transmission rate for the wireless channel.

11. The method of claim 9, further comprising:
    if the current transmission rate is the highest of the predefined transmission rates, maintaining the current transmission rate.

12. The method of claim 9, further comprising:
    if intermittent interference is not detected, decreasing the transmission rate for the wireless channel.

13. The method of claim 12 wherein:
    decreasing the transmission rate further comprises decreasing the transmission rate while maintaining the packet length.

14. A machine readable medium having embodied thereon a computer program, said computer program being executable by a machine to perform a method comprising:
    determining a packet error ratio for transmissions of packets of X length, at a current transmission rate, between two direct-sequence spread spectrum ("DSSS") devices through a wireless channel;
    if the packet error ratio is above a predefined threshold, detecting if intermittent interference is present on the wireless channel; and
    if intermittent interference is detected, increasing the transmission rate for the wireless channel while maintaining the packet length.

15. The machine readable medium of claim 14, wherein the computer program is further executable by a machine to:
    determine if the current transmission rate is the highest of a predefined set of transmission rates; and
    if the current transmission rate is not the highest of the predefined transmission rates, increase the transmission rate for the wireless channel.

* * * * *